Oct. 9, 1962
G. G. MULLER ET AL
3,058,055
SEMI-AUTOMATIC RELAY TEST CIRCUIT
Filed May 12, 1959
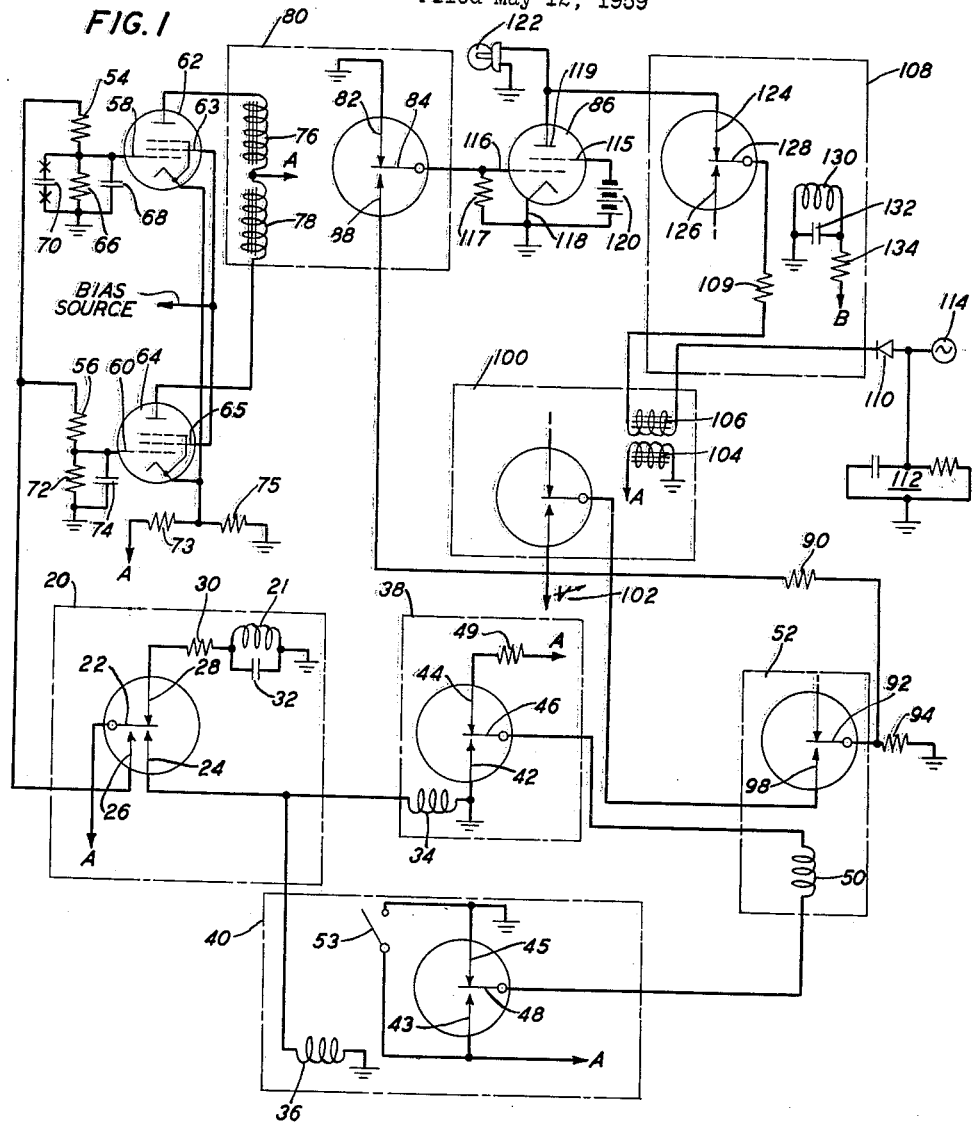
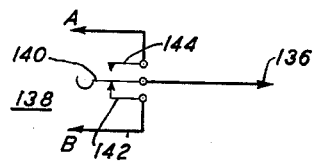
INVENTORS G.G. MULLER
W.D. O'BRIEN
BY
J.C. Redmond Jr.
ATTORNEY

United States Patent Office 3,058,055
Patented Oct. 9, 1962

3,058,055
SEMI-AUTOMATIC RELAY TEST CIRCUIT
George G. Muller, Chatham, N.J., and William D. O'Brien, New York, N.Y., assignors to Bell Telephone Laboratories, Incorporated, New York, N.Y., a corporation of New York
Filed May 12, 1959, Ser. No. 812,709
5 Claims. (Cl. 324—28)

This invention relates to test circuits for relay devices and more particularly to a test circuit for detecting insufficient gas pressure in gas-filled relays.

In certain relay devices, for example, the sealed reed relay shown in Ellwood Patent 2,289,830 issued July 14, 1942, the contacts thereof are protected from corrosion by enclosing them in a sealed tube having a gas therein at a suitable pressure. When the gas pressure within the tube is low from inadequate filling or reduced through leakage, the lifetime of the relay will be shortened either through corrosion or damage due to greater susceptibility to arcing. As a consequence, the manufacture of high quality gas-filled relays requires that each device be tested for a preselected gas pressure which will ensure maximum operating lifetime of the device. Since the relays are manufactured on an assembly line, the testing must be done rapidly and by an operator of little skill.

An object of the present invention is a rapid and accurate testing circuit for gas-filled relays.

A more specific object of the present invention is a sensitive testing circuit for detecting insufficient gas pressure within a gas-filled relay without affecting the switching characteristics thereof.

Another object of the invention is a testing circuit for gas-filled relays which requires little or no skill to operate by an operator.

A feature of the present invention is a semi-automatic test circuit which, when activated by an operator, applies suitable voltage and current through a gas-filled relay placed therein to cause arcing thereof, the pressure condition of the relay being indicated to the operator by a visual display in accordance with the duration and character of the arcing, after which the test circuit is reset for the next testing operation.

A more specific feature of the present invention is means for inspecting a gas-filled relay under a voltage and current test to determine whether or not the relay is arcing abnormally as a result of low gas pressure therein, said means disconnecting the voltage from the test relay upon such arcing.

Another specific feature of the present invention is means for timing the operation of a switching circuit in connecting and disconnecting a detecting means or thyratron circuit to a test relay located in a supply circuit, the detecting means disconnecting the supply circuit from a defective test relay after the completion of a test, the timing means returning the switching circuit to the start condition.

In an illustrative embodiment, the present invention comprises a gas-filled relay connected for testing purposes in a supply circuit, the voltage and current of the supply circuit being selected to cause abnormal arcing of the relay, upon opening thereof, when the gas pressure therein is below a preselected value. The relay is opened and closed by suitable means controlled by a timing means which, when activated by a start circuit under the control of an operator initiates and times the inspection of the test relay. A switching circuit controlled by the timing means connects and disconnects a thyratron circuit to the relay under test a preselected interval after the opening thereof. The thyratron circuit automatically disconnects the supply circuit from the test relay and provides a signal to the operator if arcing of the test relay occurs while the thyratron circuit is connected thereto. On failure of the thyratron circuit to detect arcing while connected to the test relay, the timing means resets the test circuit for the next testing operation.

Other objects and features of the present invention will be more fully comprehended from the following detailed specification taken in conjunction with the appended drawing in which:

FIG. 1 is a schematic diagram of the test circuit of the present invention; and

FIG. 1A is a schematic diagram of a start circuit included in the circuit of FIG. 1.

As shown in FIG. 1, the test circuit of the present invention includes a conventional transfer relay 20 having a coil 21, an armature 22, front contacts 24 and 26 and a back contact 28. The armature 22 is normally in contact with the back contact 28 and connected to point A of a start circuit (see FIG. 1A) to be described in more detail hereinafter. The back contact 28 is connected to the coil 21 through a resistor 30. A capacitor 32 is in parallel with the coil. On the application of voltage to point A of relay 20, it will be seen that the armature 22 will transfer to the front contacts 24 and 26 after the capacitor is charged, the armature retaining this closed position until the capacitor discharges through the coil 21. The closing and opening cycle of the relay 20 is the fundamental timing means of the test circuit of FIG. 1, the frequency of the cycle being selected to permit proper and accurate inspection of each gas-filled relay being manufactured on an assembly line.

The front contact 24 of relay 20 is connected to one end of coils 34 and 36 of transfer relays 38 and 40, respectively. The other end of coil 36 is connected directly to ground whereas the other end of the coil 34 is connected to ground and a front contact 42 of the relay 38.

Also included in the relay 38 are a back contact 44 and an armature 46, the latter being connected to one end of a coil 50 of a relay 52 to be inspected by the test circuit of the present invention for adequate gas pressure therein. The back contact 44 of the relay 38 is connected through a load resistor 49 to the start circuit designated by the letter A.

Included in the relay 40 are a front contact 43, a back contact 45 and an armature 48, the latter being connected to the other end of coil 50 of the test relay 52. The front contact 43 of the relay 40 is connected to point A of the start circuit and to one side of a snap switch 53. The back contact 45 of relay 40 is connected to ground and to the other side of the switch 53, which, when closed, removes the relay 40 from the test circuit by short circuiting the back and front contacts thereof. The switch 53 is necessary to permit the testing of either polar or biased relays and switches.

The function of the relays 38 and 40 is to make and break the test relay 52, the coil 50 of the test relay being normally energized until the relays 38 and 40 transfer, on the application of voltage thereto by the relay 20, which shall be referred to hereinafter as the timing means 20. It should be noted, however, that when an unbiased relay or switch is being tested, the contacts thereof will remain operated unless the correct or open position of the switch 53 is selected.

Returning to the timing means 20 it will be seen that the front contact 26 thereof is connected to resistors 54 and 56 of suitable value which in turn are connected to grids 58 and 60, respectively, of vacuum tubes 62 and 64, respectively, which may be typically of the 50L6 classification. Associated with the grids 58 and 60 are first and second time constant circuits, respectively, the first circuit including a resistor 66 and a pair of capacitors 68 and 70, all the elements being in parallel. The capacitor 70 is adapted to be inserted and removed easily from the circuit for reasons to be explained hereinafter. The second time constant circuit includes a resistor 72 and a capacitor 74 and has a larger time constant than that of the first time constant circuit.

The cathodes of the tubes 62 and 64 are connected together and to a voltage divider including resistors 73 and 75 energized between ground and point A of the start circuit. The screen grids 63 and 65 of the tubes 62 and 64, respectively, are connected together and to a biasing source (not shown). The plates of the tubes 62 and 64 are connected to corresponding ends of coils 76 and 78, respectively, the other end of the coils being connected together and to point A of the start circuit. The coils are included in a switching device or transfer relay 80 to be described hereinafter. The heaters (not shown) of the tubes are energized in any well-known manner from a suitable power supply (not shown).

It will be seen that the tube networks, hereinafter referred to as the switching circuit or means, open and close the relay 80 in accordance with the charging times of their time constant circuits which are different. When capacitors 68 and 70 are charged, tube 62 is biased into conductance and the plate current flows through the coil 76 to the start circuit and back to the cathode of the tube, the plate current causing the relay 80 to be placed in one condition. Shortly thereafter, the capacitor 74 becomes charged and the tube 64 conducts, the flux of the coil 78 opposing that of the coil 76 to return the relay 80 to the initial condition. The interval during which the relay 80 is closed is, of course, dependent upon the values of the resistors 66, 72, and capacitors 68, 70 and 74. Since capacitor 70 is removable from the switching means, as mentioned hereinbefore, the capacitance value in the first time constant circuit may be selected in accordance with the desired interval for sampling the test relay which will be described hereinafter.

The switching means cease operation when the timing means 20 changes state from a closed condition to an open condition, the time constant circuits associated with the tubes 62 and 64 discharging through their resistors.

The transfer relay 80 is considered to be part of the switching means and includes a back contact 82, which is grounded, an armature 84 connected to a thyratron tube 86 which may be typically of the 2D21 classification, and a front contact 88 connected through a resistor 90 of suitable value to an armature 92 of the test relay 52. The armature 92 is connected to ground through a load resistor 94 of suitable value (typically 5000 to 6000 ohms). The purpose of the relay 80 is to connect and disconnect the thyratron tube to/from the resistor 94.

The test relay 52 may be any one of the well-known types of gas-filled relays, e.g., mercury or reed, and includes at least a front contact 98 which is connected through a transfer relay 100 to a supply source 102 of variable voltage (typically in the range of 500 to 1000 volts) and current. The relay 100 is operated by coil 104 which is energized from the point A of the start circuit. A coil 106 of the relay 100 is included in the thyratron circuit, described hereinafter, and serves to open the relay 100 by bucking the influence of coil 104, when the thyratron is in the conducting state. The purpose of the relay 100 is to connect and disconnect the supply source 102 from the relay 52. The relay 100 and the circuitry associated therewith shall be referred to hereinafter as the supply circuit.

It will be appreciated that when the contacts of a gas-filled relay operated at rated voltage and current are opened, the gap resistance does not change immediately from zero to infinity. As a result, arcing occurs between the contacts, the duration and character of the arcing being a function of the gas pressure of the relay. At high gas pressures, the arcing is of short duration and non-violent whereas at low gas pressure the arcing is continuous and violent due to ionization in the gap. For purposes of this specification, the continuous and violent arcing of the relay is designated as abnormal arcing. Before testing of the relays commences, the voltage and current of the supply circuit are selected empirically to produce abnormal arcing of the relays under test for pressures 50 pounds less than that which is desired to be maintained in a test relay. Hence detection of abnormal arcing will indicate a defective test relay.

The thyratron tube 86 has a thyratron anode circuit which includes a transfer relay 108, a resistor 109, the coil 106, and a suitable direct current source of anode voltage, shown as derived from a rectifier 110, a filter circuit 112, and a source of alternating current 114. The control grid 116 of the tube 86 is connected to the armature 84 of the relay 80 and through resistor 117 to a grounded cathode 118 of the tube 86. The screen grid 115 of the tube is biased properly to a threshold voltage for operation thereof by a source 120 of direct current connected between the screen grid and the cathode. The heater (not shown) of the tube is energized by suitable circuitry (not shown). The tube 86 includes an anode 119 connected to one side of a neon lamp 122, the other side of which is grounded. The lamp is normally lit as will be seen hereinafter.

The anode 119 is also connected to a back contact 124 of the relay 108 which includes a front contact 126, an armature 128, and a coil 130. In parallel with the coil 130 is a capacitor 132, the combination being in series with a resistor 134 normally energized from a tap point B of the start circuit. With the coil 130 energized, the armature 128 engages the contact 126 which disconnects the anode of the thyratron tube 86 and the lamp 122 from the source 114. The relay 108 is adapted to be operated approximately a half second after the operating voltage is applied to the timing relay 20. The delay in operating the relay 108 permits the other components of the test circuit to reach a steady-state condition before the thyratron circuit is energized thereby preventing transient conditions from causing false indication of abnormal arcing when the switching means, as explained hereinafter, connects the thyratron circuit to the armature of the test relay and the resistor 94.

The armature 128 of the relay 108 is connected through the resistor 109, the coil 106 of relay 100 and thence to the rectifier 110 and the filter circuit 112. The rectifier is connected to the source 114 and paralleled by the filter circuit which smooths the rectifier output.

The purpose of the detecting means or thyratron circuit is to detect the presence or absence of abnormal arcing in the test relay 52. Since a test relay having adequate gas pressure therein will arc for a short duration upon opening, it is important that the thyratron circuit be connected to the resistor 94 in series with the armature 92 of the test relay after the normal arcing therein terminates. For purposes of this specification the time delay in connecting the thyratron circuit to the armature 92 and the resistor 94 is designated a preselected time interval which is a function of the resistor 66 and the capacitors 68 and 70 of the first time constant circuit. Before testing of the relays commences, the values of these elements are selected empirically in accordance with the arcing period of a test relay having adequate pressure therein.

The start circuit shown in FIG. 1A is connected to various points designated A and B in FIG. 1. The start circuit includes a source 136 of direct current, a switch 138 having a contact arm 140, a back contact 142 connected to the point designated B and a front contact 144 connected to the points designated A. The contact arm 140 is under the control of an operator and is transferred from the back contact 142 to the front contact 144 to initiate operation of the test circuit. The operator holds the armature in contact with the front contact during the test of the relay and releases the armature upon the completion of the test.

Having described the arrangement of the test circuit and the function of elements included therein, the remaining paragraphs of the specification will be devoted to the operation of the test circuit.

The test circuit is prepared for operation by connecting the test relay 52 to the circuit in the manner shown in FIG. 1 and previously described. The switch position shown in FIG. 1A is checked to ensure that the relay 108 is operated and the thyratron circuit disconnected from the source 114. Next, the switch 138 is transferred by the operator from the contact 142 to the contact 144. Removal of the source voltage from contact 142 causes the relay 108 to release, which, as previously described, is delayed until the capacitor 132 discharges through the coil 130. With the contact arm 140 engaging the contact 144, the source 136 is connected to the contact 144 and energizes the timing means 20; closes the test relay 52; and, closes the relay 100 to connect the supply circuit to the relay 52. Thereafter, the capacitor 32 and the coil 21 of the timing means 20 commence to charge, the coil having sufficient voltage across it about 14 milliseconds later, to cause transfer of the armature 22 from the back contact 28 to the front contacts 24 and 26.

On operation of the timing means, the voltage of the start circuit is supplied to the coils 34 and 36 of the relays 38 and 40, respectively, and to the time constant circuits of the switching means. The energized coils 34 and 36 cause the relays 38 and 40, respectively, to operate approximately one to three milliseconds after the operation of the timing means, thereby causing the test relay 52 to release and open the supply circuit. Concurrently, the time constant circuit of tube 62 has been charging and ultimately tube 62 becomes sufficiently conductive to permit operation of relay 80 thereby connecting the thyratron grid 116 to the load resistor 94. As previously mentioned, the components 66, 68, and 70 of the first time constant circuit are chosen to cause this to occur a preselected time interval after the opening of the test relay. Subsequently, the second time constant circuit becomes charged to a point where tube 64 conducts sufficiently to cause release of relay 80 through the bucking influence of the current in winding 78. The interval during which the armature 84 and the contact 88 of the relay 80 are engaged is termed the sampling period.

In the event arcing of the relay 52 occurs during the sampling period, the concurrent IR drop across resistor 94 will cause firing of the thyratron, provided relay 108 has already released. The plate current of the thyratron passes through the relay 108, the coil 106, and through ground to the cathode 118. The plate current in the coil 106 produces flux which opposes that of the coil 104 to release the relay 100 which disconnects the supply source 102 from the relay under test. The conductance of the thyratron circuit also short circuits the lamp 122 which goes out and serves as a visual indication to the operator of a defective test switch.

The test circuit operates on a repetitive basis. At the end of the sampling period, capacitor 32 discharges through coil 21 to release the timing means. This in turn removes the start circuit voltage applied to the time constant circuits of the switching means and the coils 34 and 36 of the relays 38 and 40, respectively. The time constant circuits discharge through their associated resistors and terminate the conductance of the tubes 62 and 64. The coils 34 and 36, when de-energized, release the relays 38 and 40, respectively, the start circuit being reconnected to the coil 50 of the test relay. The next cycle of operation then starts provided switch 138 is still operated. It will be appreciated that as long as switch 138 is held closed relay 108 remains in the released state and the relay 100 remains operated unless the thyratron 86 has fired.

If no abnormal arcing occurs, the lamp 122 remains lit as long as the operator holds switch 138 closed (usually about 10 seconds), thus indicating that the test switch is satisfactory. If, however, abnormal arcing occurs, the light will go out, indicating to the operator that the gas pressure in the relay is too low. In either case the operator will then release the armature 140 of switch 138, thereby restoring all elements of the test circuit to the conditions existing before the switch armature was deflected. The circuit is then ready for another test relay.

It is believed evident from the foregoing that the test circuit of the present invention provides a rapid and accurate testing device which is sensitive and reliable in operation in detecting insufficient gas pressure in gas-filled relays. The test circuit provides visual indication of satisfactory or defective relays and is especially suitable for use on an assembly line since it may be operated by a person of little skill without the exercise of any judgment.

It can be appreciated that the above-described test circuit for relay devices is merely illustrative of the principles of the present invention. Numerous other arrangements and modifications thereof may be devised by those skilled in the art without departing from the spirit and scope of the present invention.

What is claimed is:

1. A testing means for detecting abnormal arcing due to insufficient gas pressure in a sealed electromagnetic switch, said means comprising a main source of operating current, an auxiliary source of operating current, and a source of testing voltage; a supply circuit including the testing voltage source, a supply control relay, and the switch under test; an operating circuit including switching means, timing means, disconnect relays, and the coil of the switch under test; a testing circuit including the switch under test, impedance means, the auxiliary source, a detector, and a control relay, said control relay having contacts for connecting the detector to the switch contacts for a sampling period of a length determined by said switching means; and a signal, said detector for operating the signal and for operating the supply control relay in response to a voltage drop in the impedance means caused by switch arcing of a preassigned duration.

2. A testing means as described in claim 1 wherein the detector includes a thyratron tube, said tube including a grid and an anode, the grid being connected to the switch contacts by the control relay, said switch being in series with the impedance means, relay means for connecting the auxiliary source of the operating current to the anode and the signal, the thyratron tube and the signal being in parallel across the auxiliary source, said relay means including reactive means for delaying its operation and a coil for de-energizing the supply control relay, said signal and supply control relay operating in response to a voltage drop in the impedance means caused by switch arcing of a preassigned duration.

3. A testing means as described in claim 1 wherein the timing means include a relay having contacts for connecting the main source of operating current to the switching means and the disconnect relays, said timing means relay having another contact leading to reactive means adapted to change the timing interval and controlling the application and removal of said operating current, the timing means thereby operating and then resetting the disconnect relays and the switching means to the starting condition for the next test.

4. A testing means as described in claim 3 wherein each of two disconnect relays includes a coil connected to the timing means, one contact for connecting the main source of operating current to the coil of the switch under test, and another contact connected to ground, one of said relays including a device adapted for short circuiting its contacts thereby permitting the testing of mechanically biased switches.

5. A testing means as described in claim 3 wherein the switching means include first and second tube networks connecting the control relay to the timing means, each tube network having a vacuum tube and a time constant circuit, said time constant circuits being of different periods and adapted by reactive means for operating at a preselected interval and for a preselected time after the opening of the test switch, the control relay being adapted to close and to open, respectively, when the first and second tube networks are conductive, said control relay having contacts for connecting the detector to the switch contacts for a sampling period of a length determined by the time constant circuits of the switching means.

References Cited in the file of this patent
UNITED STATES PATENTS

| | | |
|---|---|---|
| 2,245,168 | Suits | June 10, 1941 |
| 2,310,747 | Payne | Feb. 9, 1943 |
| 2,435,753 | Richter | Feb. 10, 1948 |